United States Patent
Liu et al.

(10) Patent No.: US 10,064,000 B2
(45) Date of Patent: Aug. 28, 2018

(54) METHOD, APPARATUS, AND STORAGE MEDIUM FOR ACQUIRING TERMINAL INFORMATION

(71) Applicant: Beijing Xiaomi Mobile Software Co., Ltd., Haidian District, Beijing (CN)

(72) Inventors: Daokuan Liu, Beijing (CN); Chunhe Yang, Beijing (CN); Shuai Liu, Beijing (CN); Xinyan Xing, Beijing (CN); Yao Tang, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/398,719

(22) Filed: Jan. 5, 2017

(65) Prior Publication Data

US 2017/0223493 A1 Aug. 3, 2017

(30) Foreign Application Priority Data

Jan. 29, 2016 (CN) .......................... 2016 1 0066101

(51) Int. Cl.
*H04W 4/02* (2018.01)
*H04W 8/24* (2009.01)

(52) U.S. Cl.
CPC ............... *H04W 4/02* (2013.01); *H04W 8/24* (2013.01)

(58) Field of Classification Search
CPC .................................. H04W 4/02; H04W 8/24
See application file for complete search history.

(56) References Cited

U.S. PATENT DOCUMENTS

| | | | |
|---|---|---|---|
| 2001/0027107 A1 | 10/2001 | Shinozaki et al. | |
| 2009/0298468 A1* | 12/2009 | Hsu ........................ | H04W 12/12 455/411 |
| 2015/0067351 A1* | 3/2015 | Wang ...................... | G06F 21/62 713/189 |
| 2015/0207917 A1 | 7/2015 | Yang et al. | |
| 2016/0330611 A1 | 11/2016 | Li et al. | |

FOREIGN PATENT DOCUMENTS

| | | |
|---|---|---|
| CN | 1304223 A | 7/2001 |
| CN | 202798875 U | 3/2013 |
| CN | 103037310 A | 4/2013 |
| CN | 103607697 A | 2/2014 |
| CN | 103841560 A | 6/2014 |

(Continued)

OTHER PUBLICATIONS

GSM Association, "Official Document 12FAST . 13—Embedded SIM Remote Provisioning Architecture", Dec. 17, 2013, Retrieved from the Internet: URL: http://www.gsma.com/connectedliving/wp-content/uploads/2014/01/1.-GSMA-Embedded-SIM-Remote-Provisioning-Architecture-Version-1.1.pdf.

(Continued)

*Primary Examiner* — Christopher M Brandt
(74) *Attorney, Agent, or Firm* — Jun He Law Offices P.C.; James J. Zhu

(57) ABSTRACT

A method, apparatus and storage medium for acquiring terminal information are provided. The method includes: detecting a state of a first terminal; and communicating with a server via a virtual identity module to enable the server to acquire information from the first terminal in response to the detected state indicating that the first terminal is lost.

9 Claims, 4 Drawing Sheets

(56) References Cited

FOREIGN PATENT DOCUMENTS

| CN | 104137587 A | 11/2014 |
|----|-------------|---------|
| CN | 104486727 A | 4/2015 |
| CN | 105491232 A | 4/2016 |
| CN | 105722064 A | 6/2016 |
| EP | 2461613 A1 | 6/2012 |
| WO | 2015102007 A1 | 7/2015 |

OTHER PUBLICATIONS

Extended European Search Report of EP 17150107.5.
International Search Report of PCT/CN2016/097727.
Office Action issued in corresponding European Application No. 17150107.5 dated May 18, 2018.
First Office Action issued in corresponding Chinese Application No. 201610066101.8 dated Jul. 3, 2018.
"Remotely ring, lock, or erase a lost device—Google Accounts Help" published on May 14, 2015, XP055474191, Retrieved from the Internet:URL:https://web.archive.org/web/20150514073245/ https://support.google.com/accounts/answer/6160500 [retrieved on May 9, 2018].
"Official Google Cloud Blog: Puffing Android to work for your business" published on Apr. 7, 2011, XP055474199, Retrieved from the Internet: URL:https://cloud.googleblog.com/2011/04/putting-android-to-work-for-your.html [retrieved on May 9, 2018].

\* cited by examiner

METHOD, APPARATUS, AND STORAGE MEDIUM FOR ACQUIRING TERMINAL INFORMATION

CROSS REFERENCE TO RELATED APPLICATIONS

This application is based on and claims the priority of the Chinese patent application No. 201610066101.8, filed on Jan. 29, 2016, which is incorporated herein by reference in its entirety.

TECHNICAL FIELD

The present disclosure is related to the field of communication technologies, and more particularly to a method, apparatus and storage medium for acquiring terminal information.

BACKGROUND

As the number of functions of handsets increases, handsets are provided with functions of other electronic devices such as PDAs (Personal Digital Assistants) and digital cameras, in addition to the communication function. As user terminals, handsets have been widely used in daily life. Meanwhile, as mobile terminals, handsets are prone to be lost or stolen due to their portability. Therefore, it has become an important technique how to establish communications with a stolen handset.

SUMMARY

Embodiments of the present disclosure provide a method, apparatus and storage medium for acquiring terminal information.

According to a first aspect of the embodiments of the present disclosure, there is provided a method for acquiring terminal information. The method includes: detecting a state of a first terminal; and communicating with a server via a virtual identity module to enable the server to acquire information from the first terminal in response to the detected state indicating that the first terminal is lost.

According to a second aspect of the embodiments of the present disclosure, there is provided an apparatus for acquiring terminal information. The apparatus includes: a processor; and a memory configured to store instructions executable by the processor, wherein the processor is configured to: detect a state of a first terminal; and communicate with a server via a virtual identity module to enable the server to acquire information from the first terminal in response to the detected state indicating that the first terminal is lost.

According to a third aspect of the embodiments of the present disclosure, there is provided a non-transitory computer-readable storage medium having stored therein instructions that, when executed by a processor of a mobile terminal, causes the mobile terminal to perform a method for acquiring terminal information. The method includes: detecting a state of a first terminal; and communicating with a server via a virtual identity module to enable the server to acquire information from the first terminal in response to the detected state indicating that the first terminal is lost.

It should be understood that both the foregoing general description and the following detailed description are only exemplary and explanatory and are not restrictive of the disclosure.

BRIEF DESCRIPTION OF THE DRAWINGS

The accompanying drawings herein which are incorporated into and constitute a part of the description, illustrate the embodiments according to the present disclosure, and serve to explain the principles of the present disclosure together with the description.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Figure 1:
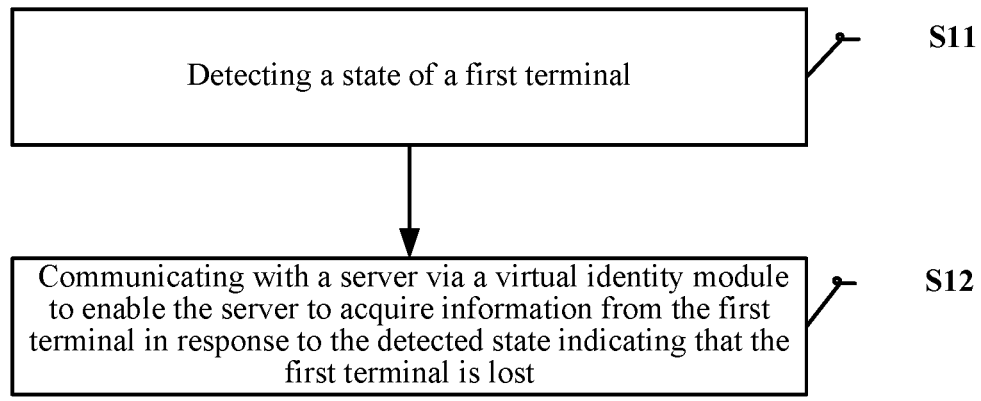
FIG. 1 is a flow chart showing a method for acquiring terminal information according to an exemplary embodiment of the disclosure.

FIG. 1 is a flow chart showing a method for acquiring terminal information according to an exemplary embodiment of the disclosure. The method is implemented in a first terminal, which may be a mobile phone, a computer, a digital broadcast terminal, a message transceiver device, a game console, a tablet device, medical equipment, fitness equipment, a personal digital assistant or the like. As shown in FIG. 1, the method includes the following steps S11-S12.

In step S11, a state of the first terminal is detected.

In step S12, in response to the detected state indicating that the first terminal is lost, communications are performed with a server via a virtual identity module to enable the server to acquire information from the first terminal.

The virtual identity module is an identity module integrated with the terminal using an embedding technique, and may be a virtual SIM (Subscriber Identity Module) card for example. Usually, a virtual SIM card can be embedded into a terminal chip as a part of the chip when the terminal leaves the factory.

Taking a virtual SIM card as an example, the first terminal needs to establish a connection with the virtual SIM card, before communicating with the server via the virtual SIM card. As the virtual SIM card is typically embedded in a chip inside the terminal, when the user activates the terminal, the user also activates the virtual SIM card. Then, the virtual SIM card is bound with a looking-for-terminal service installed inside the terminal, enabling the virtual SIM card to be used for communications with the server.

Figure 2:
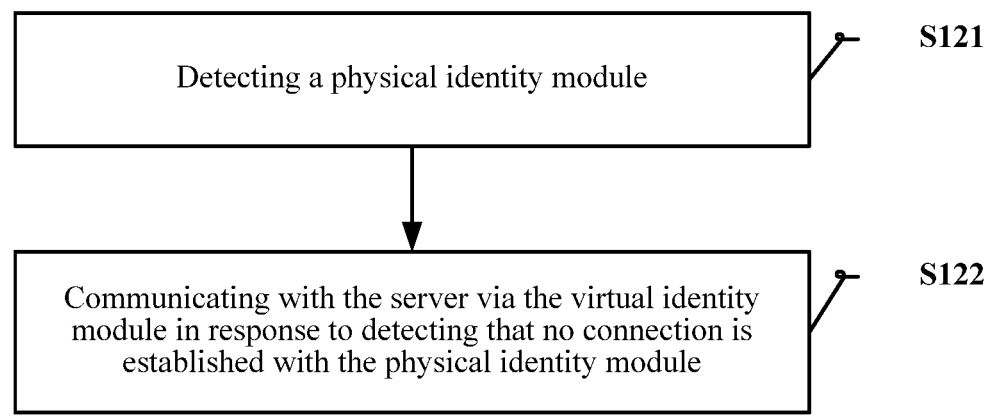
FIG. 2 is a flow chart showing step S12 of the method for acquiring terminal information according to an exemplary embodiment of the disclosure.

In an embodiment, as shown in FIG. 2, step S12 may be implemented as steps S121-S122.

In step S121, a physical identity module is detected.

The physical identity module may be a physical SIM card inserted into the terminal.

In step S122, in response to detecting that no connection is established with the physical identity module, communications with the server are performed via the virtual identity module.

It can be detected that no connection is established with the physical identity module in at least one of the following two cases.

Case 1: a disconnection with the physical identity module is detected.

For example, when the physical SIM card is pulled out from the first terminal, the first terminal will be disconnected with the physical SIM card. Then, the first terminal detects a disconnection with the physical identity module.

Case 2: a failure of connection with the physical identity module is detected.

For example, when the mobile network option of the first terminal is disabled, the first terminal cannot establish a connection with the physical SIM card. Then, the first terminal detects a failure of connection with the physical identity module.

When the first terminal cannot establish a connection with the physical identity module for whatever reason, communications cannot be performed via the physical identity module but need to be performed via the virtual identity module built in the first terminal.

With the above technical solution of the embodiment of this disclosure, a state of a first terminal is detected; and when the state indicates that the first terminal is lost, communications are performed with a server via a virtual identity module to enable the server to acquire information from the first terminal. In this manner, information from the lost first terminal can be acquired without relying on a physical identity module but just via a virtual identity module, thereby preventing loss of important information in a stolen terminal and increasing the possibility of finding back the stolen terminal.

In an embodiment, after step S121 is performed, if a connection with the physical identity module is detected, communications with the server may be performed via the physical identity module.

In the above embodiment, it may be determined that the first terminal is lost using at least one of the following methods A1-A3.

Method A1: When first predetermined information sent by an identity card bound with the first terminal is received, it is determined that the first terminal is lost. The identity card bound with the first terminal may send the first predetermined information to the first terminal via a short message, a multimedia message or the like.

Method A2: When it is detected that an identity card other than a preset identity card is inserted into the first terminal, it is determined that the first terminal is lost.

Method A3: When second predetermined information sent by a cloud server bound with the first terminal is received, it is determined that the first terminal is lost.

In an embodiment, step S12 may be implemented as: in response to the state indicating that the first terminal is lost, communicating with the second terminal via the server. In this step, the first terminal communicates with the second terminal via the virtual identity module.

The second terminal may be a mobile phone, a computer, a digital broadcast terminal, a message transceiver device, a game console, a tablet device, medical equipment, fitness equipment, a personal digital assistant or the like, which is bound with the first terminal.

In this embodiment, communications can be performed with a second terminal through the server after the first terminal is lost, so that the second terminal can acquire information from the lost first terminal via the virtual identity module without relying on a physical identity module, thereby preventing loss of important information in a stolen terminal and increasing the possibility of finding back the stolen terminal.

In an embodiment, the process for the first terminal to communicate with the second terminal via the virtual identity module and through the server may include at least one of approaches a-d.

a. The first terminal sends its current position information to the second terminal through the server.

The current position information of the first terminal may be acquired by a GPS (Global Positioning System) sensor inside the first terminal or by the looking-for-terminal service installed inside the first terminal. After the first terminal sends its current position information to the second terminal, the second terminal can track the first terminal based on the acquired current position information so as to quickly retrieve the first terminal.

b. The first terminal sends stored target data to the second terminal through the server.

The target data may be preset by the user and may include at least one of the following information: a contact book, records of communications with preset contacts, short messages, data of preset types (such as photos, videos etc.) and the like.

c. The first terminal sends a call request to the second terminal via the server.

d. The first terminal receives a control instruction sent by the second terminal through the server, and the control instruction instructs to set the target data to an invisible state.

The control instruction may instruct to set the target data to an invisible state by instructing to delete the target data or to set the target data to a hidden state. When the control instruction instructs the first terminal to delete the target data, the first terminal may perform only an operation of deleting the target data, or may first send the target data to the second terminal and then perform the operation of deleting the target data. The advantage of doing so is that undesirable consequences caused by important data being stolen due to the target data in the lost first terminal being visible to others can be prevented, thereby enabling the target data in the first terminal to be protected.

With this embodiment, loss of important information in the stolen terminal can be prevented, and the possibility of finding back the first terminal is increased.

It should be noted that the above four communication approaches a-d may be performed individually or in various combinations and, when the above four communication approaches a-d are performed in combination, the order in which the approaches are performed is not limited.

In the followings, a specific embodiment will be given to explain the enhanced terminal anti-theft method according to the disclosure.

Figure 3:
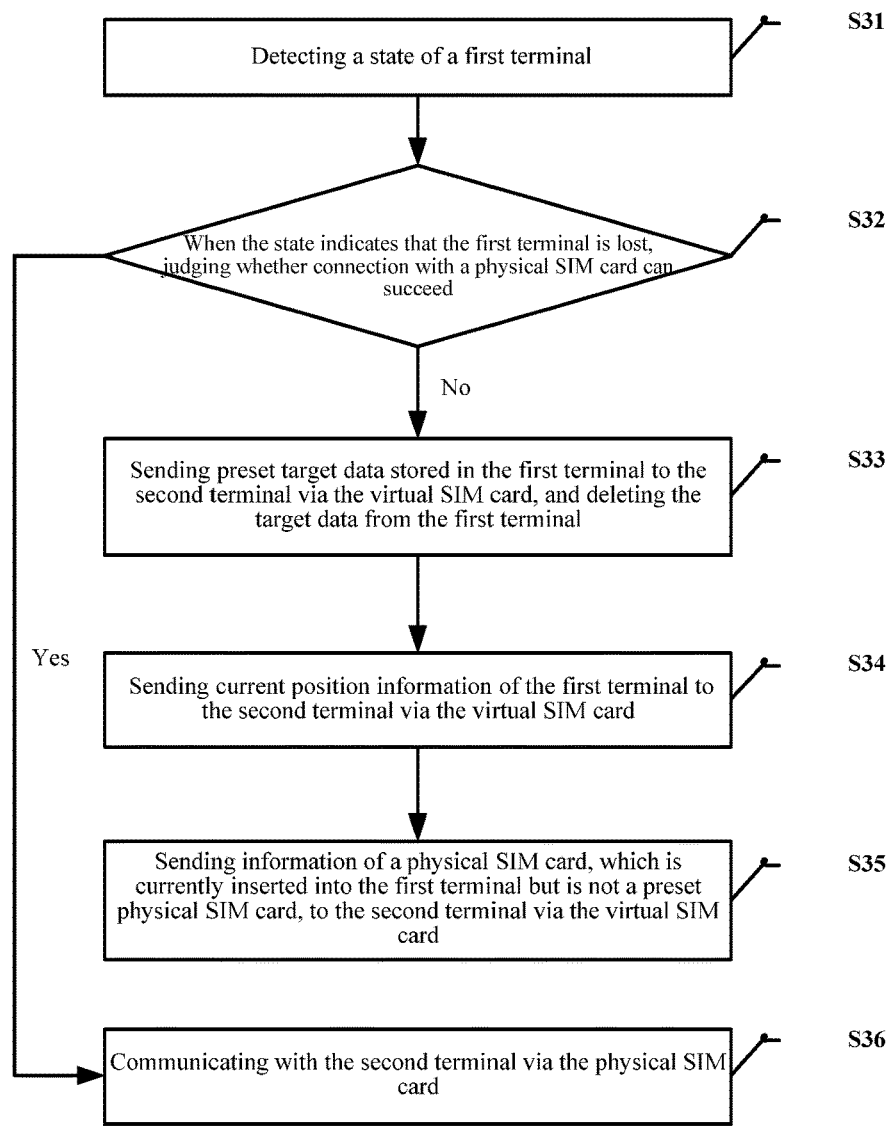
FIG. 3 is a flow chart showing a method for acquiring terminal information according to another exemplary embodiment of the disclosure.

FIG. 3 is a flow chart showing a method for acquiring terminal information according to a specific embodiment of the disclosure. In this embodiment, a virtual identity module is a virtual SIM card inside the terminal. A physical identity module is a physical SIM card inserted into the terminal. As shown in FIG. 3, the method is implemented in a first terminal and includes the following steps S31-S36.

In step S31, a state of the first terminal is detected.

In step S32, when the state indicates that the first terminal is lost, it is judged whether connection with the physical SIM card can succeed. If the connection succeeds, step S36 is performed. If it fails, step S33 is performed.

In step S33, preset target data stored in the first terminal is sent to a second terminal via the virtual SIM card, and then deleted from the first terminal.

The target data may include at least one of the following information: a contact book, records of communications with preset contacts, short messages, data of preset types (such as photos, videos etc.) and the like.

The second terminal may be a mobile phone, a computer, a digital broadcast terminal, a message transceiver device, a game console, a tablet device, medical equipment, fitness equipment, a personal digital assistant or the like, which is bound with the first terminal.

In step S34, current position information of the first terminal is sent to the second terminal via the virtual SIM card.

In step S35, information of a physical SIM card, which is currently inserted into the first terminal but is not a preset physical SIM card, is sent to the second terminal via the virtual SIM card.

In step S36, communications with the second terminal are performed via the physical SIM card.

The order of executing steps S33-S35 is not limited. Rather, these steps may be executed simultaneously or changed in an arbitrary order.

In this embodiment, when the first terminal succeeds in connecting with a physical SIM card inserted into the first terminal, it can communicate with the second terminal via the physical SIM card. When it fails to connect with a physical SIM card inserted into the first terminal, the first terminal communicates with the second terminal via the virtual SIM card. In this way, the first terminal can communicate with another terminal even if it cannot establish a connection with a physical SIM card inserted into the first terminal, thereby preventing loss of important information in the first terminal and increasing the possibility of finding back the first terminal.

The followings are apparatus embodiments of this disclosure, which can perform the method embodiments of this disclosure.

Figure 4:
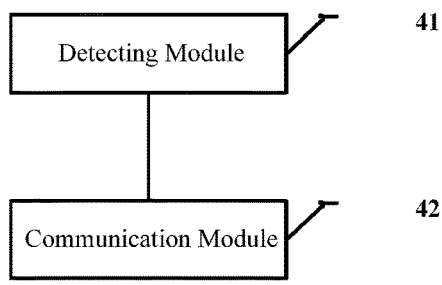
FIG. 4 is a block diagram of an apparatus for acquiring terminal information according to an exemplary embodiment of the disclosure.

FIG. 4 is a block diagram of an apparatus for acquiring terminal information according to an exemplary embodiment of the disclosure. The apparatus may be implemented as an electronic device or part of it by software, hardware or a combination thereof. Referring to FIG. 4, the apparatus for acquiring terminal information includes a detecting module 41 and a communication module 42.

The detecting module 41 is configured to detect a state of a first terminal.

The communication module 42 is configured to, in response to the state detected by the detecting module 41 indicating that the first terminal is lost, communicate with a server via a virtual identity module to enable the server to acquire information from the first terminal.

The virtual identity module is an identity module integrated with the terminal using an embedding technique, and may be a virtual SIM (Subscriber Identity Module) card. Usually, a virtual SIM card can be embedded into a terminal chip as a part of the chip when the terminal leaves the factory.

Taking a virtual SIM card as an example, the first terminal needs to establish a connection with the virtual SIM card, before communicating with the server via the virtual SIM card. As the virtual SIM card is typically embedded in a chip inside the terminal, when the user activates the terminal, the user also activates the virtual SIM card. Then, the virtual SIM card is bound with a looking-for-terminal service installed inside the terminal, enabling the virtual SIM card to be used for communications with the server.

With the apparatus provided by the above embodiment, the detecting module 41 detects a state of the first terminal; and when the state indicates that the first terminal is lost, the communication module 42 communicates with the server via a virtual identity module to enable the server to acquire information from the first terminal. In this manner, information from the lost first terminal can be acquired without relying on a physical identity module but just via a virtual identity module, thereby preventing loss of important information in a stolen terminal and increasing the possibility of finding the stolen terminal.

In the above embodiment, it may be determined that the first terminal is lost using at least one of the following methods A1-A3.

Method A1: When first predetermined information sent by an identity card bound with the first terminal is received, it is determined that the first terminal is lost. The identity card bound with the first terminal may send the first predetermined information to the first terminal via a short message, a multimedia message or the like.

Method A2: When it is detected that an identity card other than a preset identity card is inserted into the first terminal, it is determined that the first terminal is lost.

Method A3: When second predetermined information sent by a cloud server bound with the first terminal is received, it is determined that the first terminal is lost.

Figure 5:
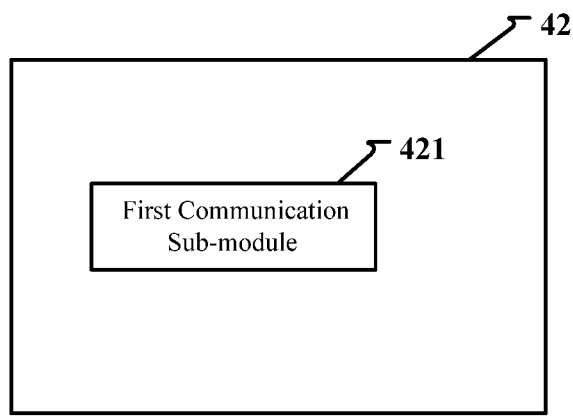
FIG. 5 is a block diagram of a communication module of an apparatus for acquiring terminal information according to an exemplary embodiment of the disclosure.

In an embodiment, as shown in FIG. 5, the communication module 42 includes a first communication sub-module 421.

The first communication sub-module 421 is configured to communicate with a second terminal through the server. The first communication sub-module 421 communicates with the second terminal via the virtual identity module.

The second terminal may be a mobile phone, a computer, a digital broadcast terminal, a message transceiver device, a game console, a tablet device, medical equipment, fitness equipment, a personal digital assistant or the like, which is bound with the first terminal.

In this embodiment, the first communication sub-module 421 can communicate with a second terminal through the server after the first terminal is lost, so that the second terminal can acquire information from the lost first terminal via the virtual identity module without relying on a physical identity module, thereby preventing loss of important information in a stolen terminal and increasing the possibility of finding back the stolen terminal.

In an embodiment, the first communication sub-module 421 is configured to perform at least one of approaches a-d.

a. The first communication sub-module 421 is configured to send current position information to the second terminal through the server.

The current position information of the first terminal may be acquired by a GPS (Global Positioning System) sensor inside the first terminal or by the looking-for-terminal service installed inside the first terminal. After the first terminal sends its current position information to the second terminal, the second terminal can track the first terminal based on the acquired current position information so as to quickly retrieve the first terminal.

b. The first communication sub-module 421 is configured to send stored target data to the second terminal through the server.

The target data may be preset by the user and may include at least one of the following information: a contact book, records of communications with preset contacts, short messages, data of preset types (such as photos, videos etc.) and the like.

c. The first communication sub-module 421 is configured to send a call request to the second terminal through the server.

d. The first communication sub-module 421 is configured to receive a control instruction sent by the second terminal through the server, and the control instruction instructs to set the target data to an invisible state.

In an embodiment, the control instruction received by the first communication sub-module 421 instructs to delete the target data or to set the target data to a hidden state. When the control instruction instructs the first terminal to delete the target data, the first terminal may perform only an operation of deleting the target data, or may first send the target data to the second terminal and then perform the operation of deleting the target data. The advantage of doing so is that undesirable consequences caused by important data being stolen due to the target data in the lost first terminal being visible to others can be prevented, thereby enabling the target data in the first terminal to be protected.

With this embodiment, loss of important information in the stolen terminal can be prevented, and the possibility of finding back the first terminal is increased.

Figure 6:
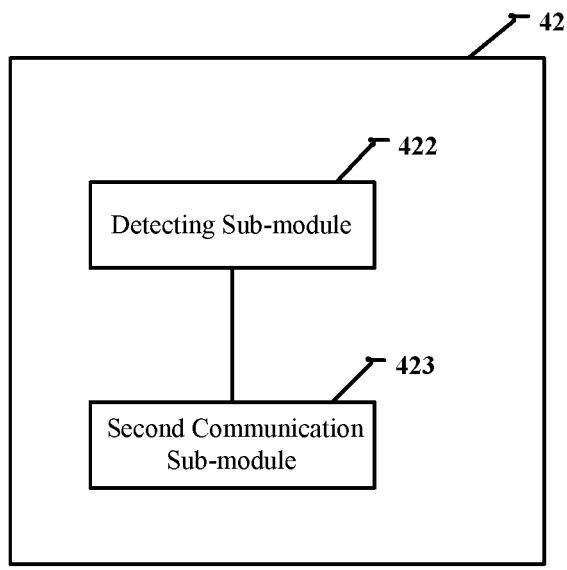
FIG. 6 is a block diagram of a communication module of an apparatus for acquiring terminal information according to another exemplary embodiment of the disclosure.

In an embodiment, as shown in FIG. 6, the communication module includes: a detecting sub-module 422 and a second communication sub-module 423.

The detecting sub-module 422 is configured to detect a physical identity module.

The physical identity module may be a physical SIM card inserted into the terminal.

The second communication sub-module 423 is configured to, in response to detecting by the detecting sub-module 422 that no connection is established with the physical identity module, communicate with the server via the virtual identity module.

In an embodiment, the second communication sub-module 423 is configured to perform at least one of: communicating with the server via the virtual identity module in response to detecting a disconnection with the physical identity module (for example, when the physical SIM card is pulled out from the first terminal, the first terminal will be disconnected with the physical SIM card; and then, the first terminal detects a disconnection with the physical identity module); and communicating with the server via the virtual identity module in response to detecting a failure of connection with the physical identity module (for example, when the mobile network option of the first terminal is disabled, the first terminal cannot establish a connection with the physical SIM card; and then, the first terminal detects a failure of connection with the physical identity module).

When the first terminal cannot establish a connection with the physical identity module for whatever reason, communications cannot be performed via the physical identity module but need to be performed via the virtual identity module built in the first terminal.

In an embodiment, there is provided an apparatus for acquiring terminal information. The apparatus includes: a processor; and a memory configured to store instructions executable by the processor. The processor is configured to: detect a state of a first terminal; and in response to the detected state indicating that the first terminal is lost, communicate with a server via a virtual identity module to enable the server to acquire information from the first terminal.

The processor configured to communicate with the server via the virtual identity identification module is further configured to: communicate with a second terminal through the server.

The processor configured to communicate with the second terminal through the server is further configured to perform at least one of: sending current position information to the second terminal through the server; sending stored target data to the second terminal through the server; sending a call request to the second terminal through the server; and receiving a control instruction sent by the second terminal through the server, the control instruction instructing to set the target data to an invisible state.

The control instruction may instruct the first terminal to delete the target data or to set the target data to a hidden state.

The processor configured to communicate with the server via the virtual identity module is further configured to: detect a physical identity module; and in response to detecting that no connection is established with the physical identity module, communicate with the server via the virtual identity module.

Detecting that no connection is established with the physical identity module includes at least one of: detecting a disconnection with the physical identity module; and detecting a failure of connection with the physical identity module.

Regarding the apparatuses in the above embodiments, the specific operations performed by the respective modules have been described in the method embodiments, and will not be elaborated herein.

Figure 7:
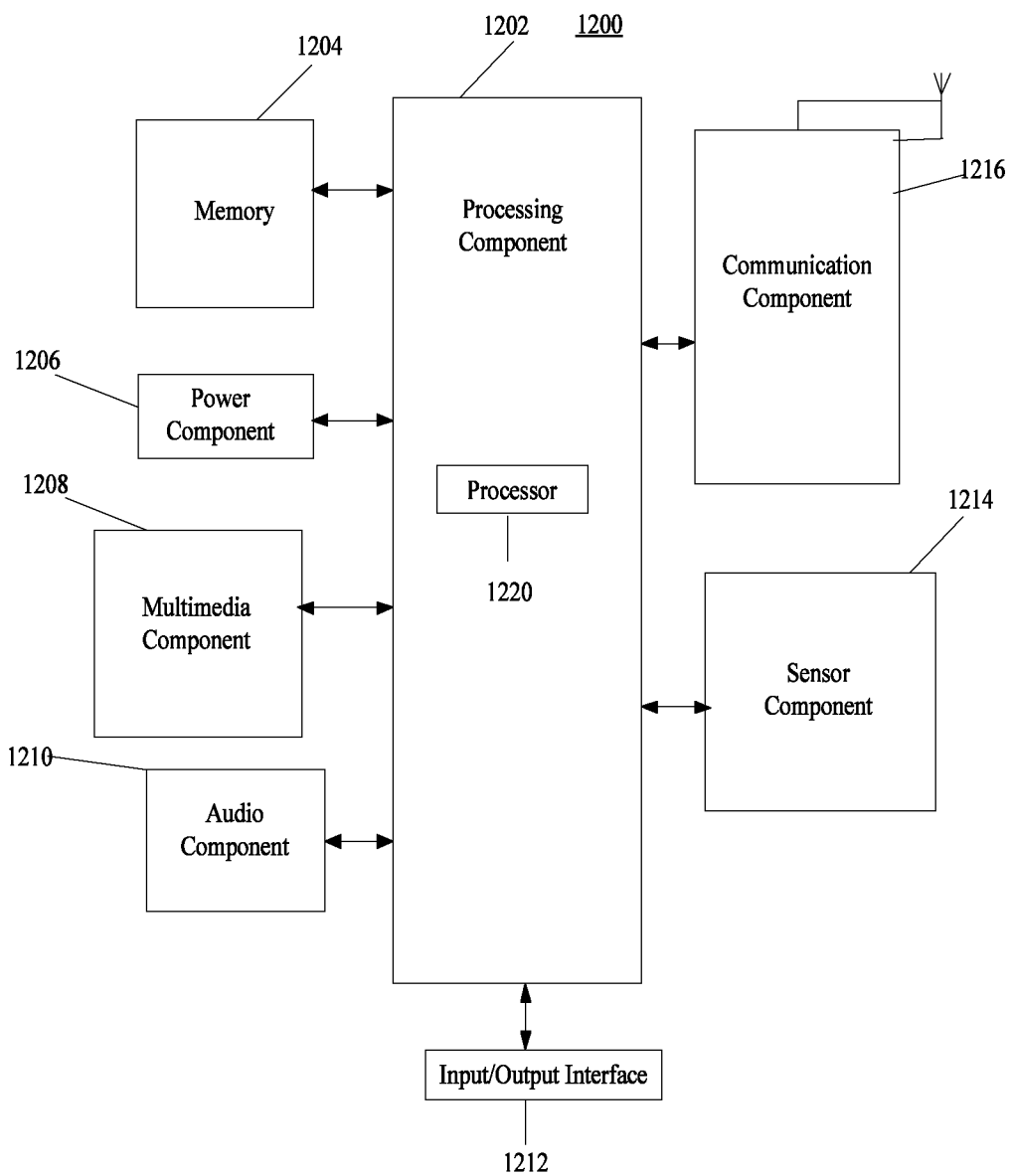
FIG. 7 is a block diagram of an apparatus for acquiring terminal information according to another exemplary embodiment of the disclosure.

FIG. 7 is a block diagram of a terminal anti-theft apparatus 1200 according to an exemplary embodiment of the disclosure. For example, the apparatus 1200 may be a mobile phone, a computer, a digital broadcast terminal, a message transceiver device, a game console, a tablet device, medical equipment, fitness equipment, a personal digital assistant, or the like.

The apparatus 1200 may include one or more following components: a processing component 1202, a memory 1204, a power component 1206, a multimedia component 1208, an audio component 1210, an input/output (I/O) interface 1212, a sensor component 1214 and a communication component 1216.

The processing component 1202 typically controls overall operations of the apparatus 1200, such as the operations associated with display, telephone calls, data communications, camera operations and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operation of the apparatus 1200. Examples of such data include instructions for any applications or methods operated on the apparatus 1200, various kinds of data, messages, pictures, video, etc. The memory 1204 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the apparatus 1200. The power component 1206 may include a power management system, one or more power sources, and any other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive an external multimedia datum while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the apparatus 1200. For instance, the sensor component 1214 may detect an open/closed status of the apparatus 1200, relative positioning of components, e.g., the display and the keypad, of the apparatus 1200, a change in position of the apparatus 1200 or a component of the apparatus 1200, presence or absence of user's contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor or a temperature sensor.

The communication component 1216 is configured to facilitate communication, wired or wirelessly, between the apparatus 1200 and other devices. The apparatus 1200 can access a wireless network based on a communication standard, such as WiFi, 2Q or 3Q or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium including instructions executable by the processor 1220 in the apparatus 1200 for performing the above-described methods. For example, the non-transitory computer-readable storage medium may be a ROM, a RAM, a CD-ROM, a magnetic tape, a floppy disc, an optical data storage device or the like.

When executed by the processor of the apparatus 1200, instructions in the non-transitory computer-readable storage medium cause the apparatus 1200 to perform the above-described terminal anti-theft method. The method includes: detecting a state of a first terminal; and in response to the detected state indicating that the first terminal is lost, communicating with a server via a virtual identity module such that the server acquires information from the first terminal.

Communicating with the server via the virtual identity module includes: communicating with a second terminal through the server.

Communicating with the second terminal through the server includes at least one of: sending current position information to the second terminal through the server; sending stored target data to the second terminal through the server; sending a call request to the second terminal through the server; and receiving a control instruction sent by the second terminal through the server, the control instruction instructing to set the target data to an invisible state.

The control instruction instructs to delete the target data or to set the target data to a hidden state.

Communicating with the server via the virtual identity module includes: detecting a physical identity module; and in response to detecting that no connection is established with the physical identity module, communicating with the server via the virtual identity module.

Detecting that no connection is established with the physical identity module includes at least one of: detecting a disconnection with the physical identity module; and detecting a failure of connection with the physical identity module.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for acquiring terminal information, implemented in a first terminal, the method comprising:
   detecting a state of the first terminal;
   in response to the detected state indicating that the first terminal is lost, detecting a physical identity module; and
   in response to detecting that no connection is established with the physical identity module, communicating with a server via a virtual identity module to enable the server to acquire information from the first terminal;
   wherein communicating with the server via the virtual identity module comprises: communicating with a second terminal through the server via the virtual identity module,
   wherein communicating with the second terminal through the server via the virtual identity module comprises: receiving a control instruction sent by the second terminal through the server, the control instruction instructing to set target data to a hidden state.

2. The method according to claim 1, wherein communicating with the second terminal through the server comprises at least one of:
   sending current position information to the second terminal through the server;
   sending the target data to the second terminal through the server; and
   sending a call request to the second terminal through the server.

3. The method according to claim 1, wherein detecting that no connection is established with the physical identity module comprises at least one of:
   detecting a disconnection with the physical identity module; and
   detecting a failure of connection with the physical identity module.

4. An apparatus for acquiring terminal information, the apparatus comprising:
   a processor; and
   a memory configured to store instructions executable by the processor,
   wherein the processor is configured to:
   detect a state of a first terminal;
   in response to the detected state indicating that the first terminal is lost, detect a physical identity module; and
   in response to detecting that no connection is established with the physical identity module, communicate with a server via a virtual identity module to enable the server to acquire information from the first terminal;
   wherein communicating with the server via the virtual identity module comprises: communicating with a second terminal through the server via the virtual identity module,
   wherein communicating with the second terminal through the server via the virtual identity module comprises: receiving a control instruction sent by the second terminal through the server, the control instruction instructing to set target data to a hidden state.

5. The apparatus according to claim 4, wherein the processor configured to communicate with the second terminal through the server is further configured to perform at least one of:
   sending current position information to the second terminal through the server;
   sending the target data to the second terminal through the server; and
   sending a call request to the second terminal through the server.

6. The apparatus according to claim 4, wherein detecting that no connection is established with the physical identity module comprises at least one of:
   detecting a disconnection with the physical identity module; and
   detecting a failure of connection with the physical identity module.

7. A non-transitory computer-readable storage medium having stored therein instructions that, when executed by a processor of a mobile terminal, causes the mobile terminal to perform a method for acquiring terminal information, the method comprising:
   detecting a state of a first terminal;
   in response to the detected state indicating that the first terminal is lost, detecting a physical identity module; and
   in response to detecting that no connection is established with the physical identity module, communicating with a server via a virtual identity module to enable the server to acquire information from the first terminal;
   wherein communicating with the server via the virtual identity module comprises: communicating with a second terminal through the server via the virtual identity module,
   wherein communicating with the second terminal through the server via the virtual identity module comprises: receiving a control instruction sent by the second terminal through the server, the control instruction instructing to set target data to a hidden state.

8. The storage medium according to claim 7, wherein communicating with the second terminal through the server comprises at least one of:
   sending current position information to the second terminal through the server;
   sending stored target data to the second terminal through the server; and
   sending a call request to the second terminal through the server.

9. The storage medium according to claim 7, wherein detecting that no connection is established with the physical identity module comprises at least one of:
   detecting a disconnection with the physical identity module; and
   detecting a failure of connection with the physical identity module.

* * * * *